United States Patent
Wynne et al.

(10) Patent No.: US 10,516,177 B2
(45) Date of Patent: Dec. 24, 2019

(54) FUEL CELL PURGE SYSTEMS AND RELATED PROCESSES

(71) Applicant: Teledyne Energy Systems, Inc., Thousand Oaks, CA (US)

(72) Inventors: Robert K. Wynne, New Freedom, PA (US); Patrick Scott Ferguson, Baltimore, MD (US); Robert Christopher Utz, Phoenix, MD (US)

(73) Assignee: TELEDYNE ENERGY SYSTEMS, INC., Thousand Oaks, CA (US)

( * ) Notice: Subject to any disclaimer, the term of this patent is extended or adjusted under 35 U.S.C. 154(b) by 333 days.

(21) Appl. No.: 15/351,664

(22) Filed: Nov. 15, 2016

(65) Prior Publication Data

US 2018/0138529 A1    May 17, 2018

(51) Int. Cl.
| | |
|---|---|
| H01M 8/04223 | (2016.01) |
| H01M 8/0662 | (2016.01) |
| H01M 8/04119 | (2016.01) |
| H01M 8/04291 | (2016.01) |
| H01M 8/1018 | (2016.01) |

(52) U.S. Cl.
CPC ... *H01M 8/04231* (2013.01); *H01M 8/04179* (2013.01); *H01M 8/04291* (2013.01); *H01M 8/0662* (2013.01); *H01M 2008/1095* (2013.01); *H01M 2250/20* (2013.01); *Y02T 90/32* (2013.01)

(58) Field of Classification Search
CPC ......... H01M 8/04231; H01M 8/04291; H01M 8/0662; H01M 8/04179; H01M 2008/1095; H01M 2250/20; Y02T 90/32
See application file for complete search history.

(56) References Cited

U.S. PATENT DOCUMENTS

| | | | | |
|---|---|---|---|---|
| 2007/0065711 A1* | 3/2007 | Gopal | ............... | H01M 8/04014 429/415 |
| 2008/0070078 A1* | 3/2008 | Gummalla | ............. | B64D 41/00 429/410 |
| 2010/0173214 A1* | 7/2010 | Fabian | ................ | H01M 8/0273 429/443 |
| 2010/0304247 A1* | 12/2010 | Tamura | ................... | C01B 3/384 429/423 |
| 2016/0053222 A1* | 2/2016 | Stewart | .................... | C12N 1/20 435/165 |
| 2017/0158343 A1* | 6/2017 | Hagh | ....................... | A62C 3/08 |

OTHER PUBLICATIONS

F. Barbir, *PEM Fuel Cells: Theory and Practice*, Elsevier, 2013.
J. Zhang, *PEM Fuel Cell Electrocataylsts and Catalyst Layers: Fundamentals and Applications*, Springer, 2008.

\* cited by examiner

*Primary Examiner* — Muhammad S Siddiquee
(74) *Attorney, Agent, or Firm* — K&L Gates LLP

(57) ABSTRACT

A fuel cell purge system includes a primary fuel cell in fluid communication with a purge cell. Fuel and oxidant purged with inert gas impurities from the primary fuel cell react in the purge cell, thereby decreasing the volume of purged gases and facilitating storage while maintaining fuel cell electrochemical performance.

19 Claims, 9 Drawing Sheets

FUEL CELL PURGE SYSTEMS AND RELATED PROCESSES

STATEMENT REGARDING FEDERALLY SPONSORED RESEARCH OR DEVELOPMENT

This invention was made with government support under contract number N0001412D0527 awarded by the Office of Naval Research (ONR), United States Department of the Navy. The government has certain rights in the invention.

BACKGROUND OF THE INVENTION

The information described in this background section is not admitted to be prior art.

Fuel cells generally operate by exothermically reacting a fuel and an oxidant to produce electricity, heat, and chemical reaction products. For example, fuel cells utilizing molecular hydrogen ($H_2$) fuel and molecular oxygen ($O_2$) as an oxidant generate electricity, heat, and water. Even though these reactants can be highly pure there will always be some level of inert gas in the reactants. These inert gases cannot be consumed in the fuel cell and will accumulate over time resulting in decreased fuel cell performance due to the reduction in reactant partial pressure. Eventually the inert gas must be removed from the fuel cell to restore fuel cell electrochemical performance. In some applications, such as underwater vehicles for example, it is not feasible to externally vent gases purged from closed-loop fuel cells. In such applications any gases purged from closed-loop fuel cells must be stored onboard until the completion of a vehicle operation or mission at which point the stored gases can be vented. The onboard storage of gases purged from fuel cells for the duration of an operation or mission requires sufficiently large onboard storage vessels, which can disadvantageously increase vehicle size and/or weight.

SUMMARY OF THE INVENTION

This specification generally relates to fuel cell technology and more particularly to fuel cell purge systems and fuel cell purging processes.

In one example, a fuel cell purge system comprises a primary fuel cell comprising a primary fuel line and a primary oxidant line, and a purge cell comprising a fuel inlet, an anode product outlet in fluid communication with the fuel inlet, an oxidant inlet, and a cathode product outlet in fluid communication with the oxidant inlet. The fuel inlet of the purge cell is in fluid communication with the primary fuel line of the primary fuel cell through a fuel purge line. The oxidant inlet of the purge cell is in fluid communication with the primary oxidant line of the primary fuel cell through an oxidant purge line. An anode product storage vessel is in fluid communication with the anode product outlet of the purge cell through an anode product line. A cathode product storage vessel in fluid communication with the cathode product outlet of the purge cell through a cathode product line.

In another example, a fuel cell purge system comprises a primary closed-loop proton exchange membrane fuel cell comprising a primary hydrogen line and a primary oxygen line, and a secondary batch-operated proton exchange membrane fuel cell comprising a hydrogen inlet, an anode product outlet in fluid communication with the hydrogen inlet, an oxygen inlet, and a cathode product outlet in fluid communication with the oxygen inlet. The hydrogen inlet of the secondary batch proton exchange membrane fuel cell is in fluid communication with the primary hydrogen line of the primary closed-loop proton exchange membrane fuel cell through a hydrogen purge line comprising a hydrogen purge valve. The oxygen inlet of the secondary batch proton exchange membrane fuel cell is in fluid communication with the primary oxygen line of the primary closed-loop proton exchange membrane fuel cell through an oxygen purge line comprising an oxygen purge valve. An anode product storage vessel is in fluid communication with the anode product outlet of the secondary batch-operated proton exchange membrane fuel cell through an anode product line comprising an anode product valve and an anode product pump. A cathode product storage vessel is in fluid communication with the cathode product outlet of the secondary batch-operated proton exchange membrane fuel cell through a cathode product line comprising a cathode product valve and a cathode product pump.

In another example, a fuel cell purging process comprises transporting fuel and inert gas from a primary fuel line in a primary fuel cell to an anode side in a purge cell, and transporting oxidant and inert gas from a primary oxidant line in a primary fuel cell to a cathode side in the purge cell. The transported fuel and oxidant are reacted in the purge cell to produce anode products and cathode products. The anode products, cathode products, and inert gas are transported to at least one storage vessel.

It is understood that the invention described in this specification is not necessarily limited to the examples summarized in this Summary.

BRIEF DESCRIPTION OF THE DRAWINGS

Various features and characteristics of the invention described in this specification may be better understood by reference to the accompanying figures, in which.

The reader will appreciate the foregoing features and characteristics, as well as others, upon considering the following detailed description of the invention according to this specification.

DETAILED DESCRIPTION OF THE INVENTION

As described above, fuel cells generally operate by exothermically reacting a fuel and an oxidant to produce electricity, heat, and chemical reaction products. Proton exchange membrane, also known as polymer electrolyte membrane, fuel cells (PEM fuel cells) can utilize molecular hydrogen ($H_2$) fuel and molecular oxygen ($O_2$) as an oxidant and produce water ($H_2O$) as the chemical reaction product. The construction and operation of fuel cells generally, and PEM fuel cells specifically, is described, for example, in F. Barbir, *PEM Fuel Cells: Theory and Practice*, Elsevier, 2013, and J. Zhang, *PEM Fuel Cell Electrocatalysts and Catalyst Layers: Fundamentals and Applications*, Springer, 2008, which are both incorporated by reference into this specification.

Figure 1:
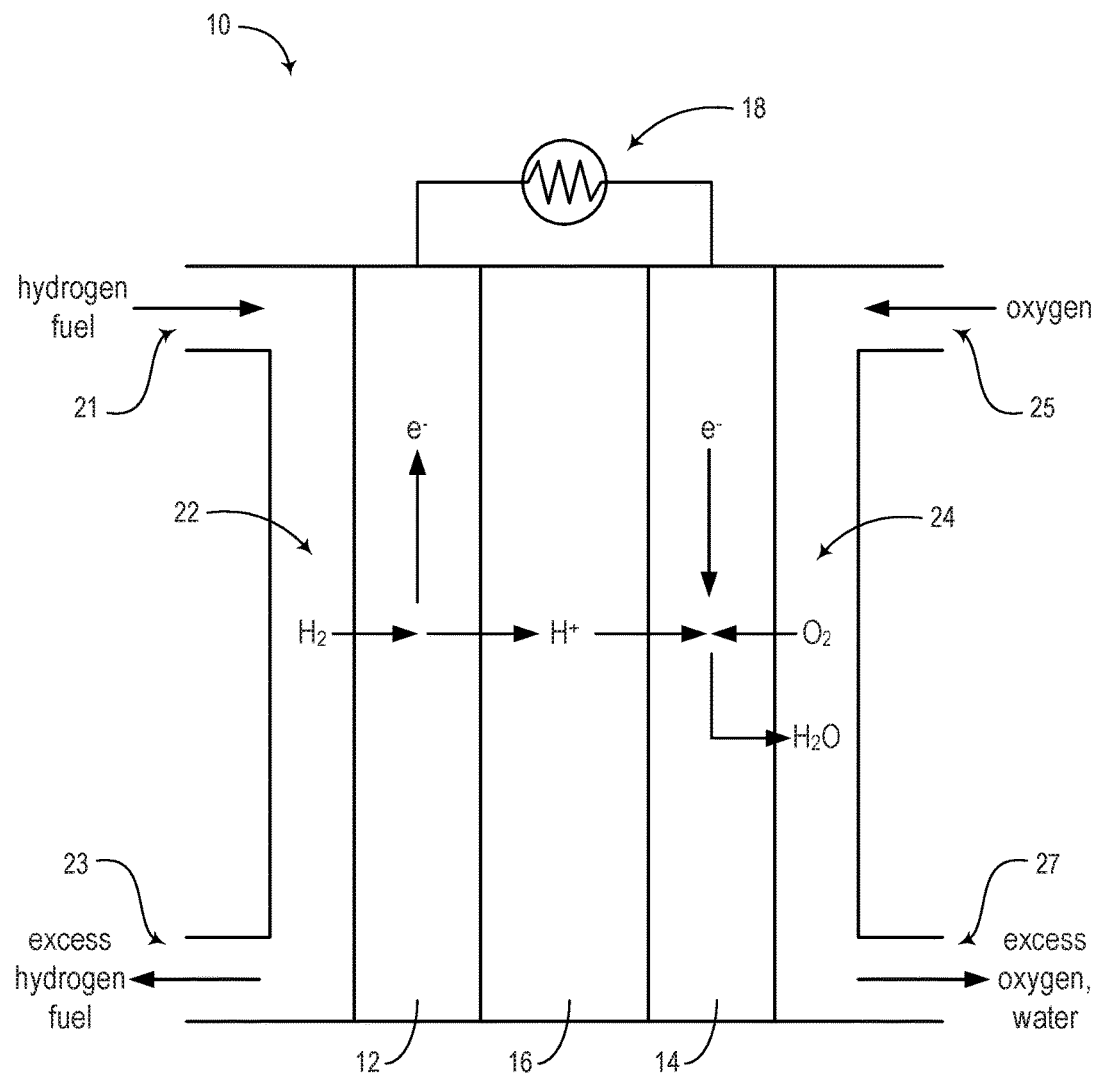
FIG. 1 is a schematic diagram of a proton exchange membrane fuel cell.

Referring to FIG. 1, a single PEM fuel cell 10 comprises an anode 12, a cathode 14, and an electrolyte membrane 16 located between the anode 12 and the cathode 14. The anode 12 and the cathode 14 are electrically conductive, porous, and generally comprise catalysts such as platinum or platinum-based materials supported on carbon nano-particles or micro-particles incorporated into the structure of the anode 12 and the cathode 14. The catalyst in the anode 12 promotes the oxidation of molecular hydrogen ($H_2$) into two protons ($H^+$) and two electrons ($e^-$). The protons produced in the anode 12 transport through the electrolyte 16 to the cathode 14. The electrolyte membrane 16 is a non-electrically-conductive polymer membrane that is permeable to the protons, but impermeable to the hydrogen and oxygen gas reactants. The electrons produced in the anode 12 are collected and form an electrical current that flows from the anode 12, through an external electrical circuit 18, and into the cathode 14. The catalyst in the cathode 14 promotes the reduction of molecular oxygen ($O_2$) into water by reacting with the protons that transport through the electrolyte membrane 16 from the anode 12 and the electrons ($e^-$) from the external electrical circuit 18.

Still referring to FIG. 1, the hydrogen and oxygen gas reactants are separately fed to the PEM fuel cell 10. The hydrogen fuel is fed through a fuel inlet 21 and flows through an anode side flow path 22 in contact with the anode 12. The excess hydrogen fuel that does not oxidize to protons and electrons at or in the anode 12 exits the anode side flow path 22 through fuel outlet 23. The oxygen is fed through an oxidant inlet 25 and flows through a cathode side flow path 24 in contact with the cathode 14. The water reaction product and the excess oxygen that does not reduce to water at or in the cathode 14 exits the cathode side flow path 24 through product outlet 27. Alternately, especially when utilizing pure hydrogen and oxygen reactants, a PEM fuel cell can operate in a non-flow-through mode (not shown) without excess reactant flow or in a "dead-ended" mode. In this case, excess hydrogen and oxygen are not continuously withdrawn from a PEM fuel cell, but instead are removed from the PEM fuel cell during a reactant purge. Fuel cells of this type typically remove excess product water utilizing porous wick structures and/or hydrophilic microporous layers that transport water but prevent hydrogen and oxygen reactants from exiting the fuel cell until a reactant purge operation is performed.

The PEM fuel cell 10 shown in FIG. 1 comprises a single cell comprising one anode 12, one cathode 14, and one electrolyte membrane 16. However, it is understood that PEM fuel cells used in power supply applications typically comprise a stack of two or more individual fuel cells connected in series or parallel. In such multiple-cell PEM fuel cells, the fuel inlet feeds into a manifold that distributes hydrogen to the anode side flow paths of each individual cell. Similarly, the anode side flow paths of each individual cell are in fluid communication with another manifold that collects excess hydrogen fuel which then flows through a common fuel outlet. Likewise, in multiple-cell PEM fuel cells, the oxidant inlet feeds into a manifold that distributes oxygen to the cathode side flow paths of each individual cell, and the cathode side flow paths of each individual cell are in fluid communication with another manifold that collects water product and excess oxygen fuel which then flows through a common product outlet.

Figure 2:
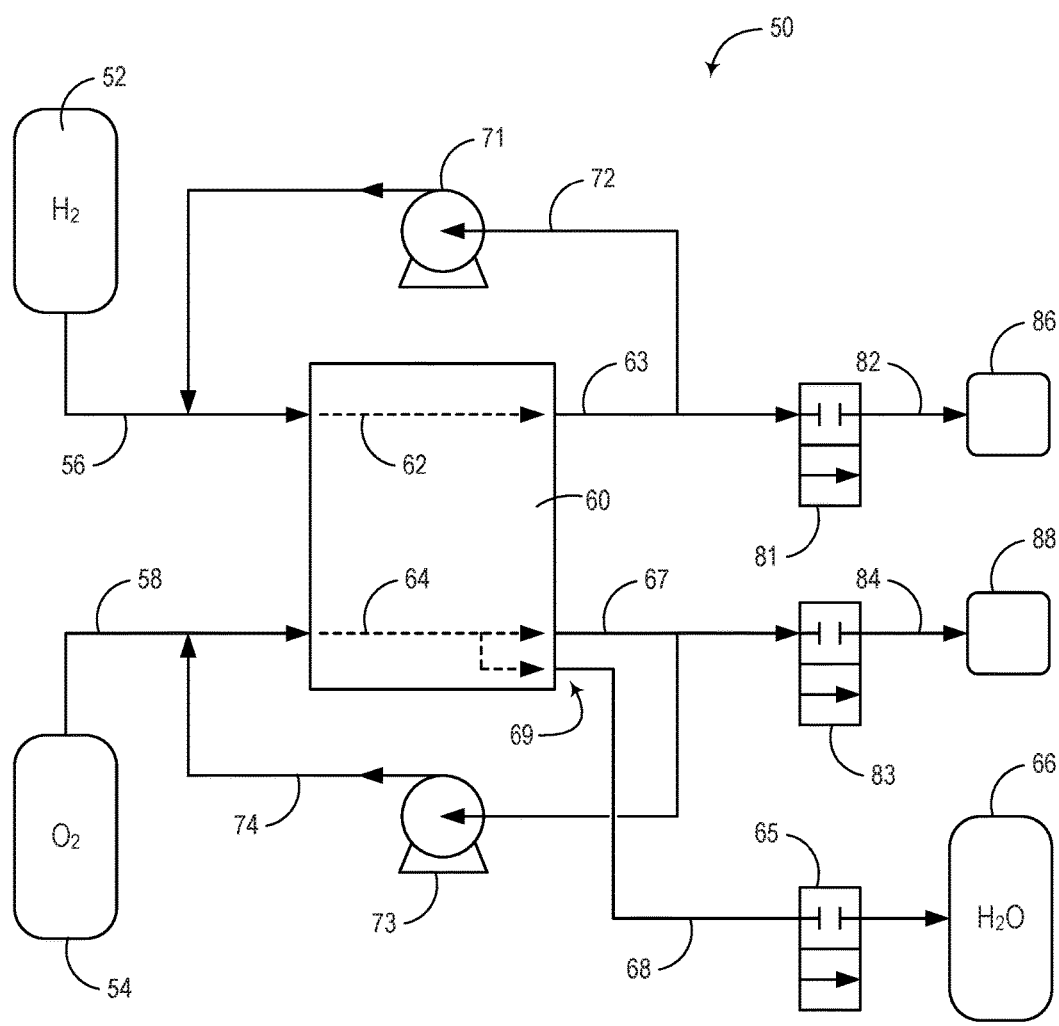
FIG. 2 is a schematic diagram of a closed-loop proton exchange membrane fuel cell system.

FIG. 2 shows one example of a closed-loop PEM fuel cell system 50. A closed-loop PEM fuel cell system does not vent or drain any reaction products or excess unreacted fuel or oxidant external to the system. The closed-loop PEM fuel cell system shown in FIG. 2 comprises recycle loops that recirculate excess unreacted hydrogen and oxygen back through the fuel inlet and oxidant inlet, respectively. Additionally, a closed-loop PEM fuel cell can comprise a water storage vessel in fluid communication with a water outlet port in the fuel cell. The water product can be separated from excess unreacted oxygen using, for example, a water-gas separation membrane located downstream from the manifold that collects the fluid streams exiting the cathode side flow paths of each individual cell comprising the closed-loop PEM fuel cell or a hydrophilic wick to extract excess water from the fuel cell.

Referring to FIG. 2, the closed-loop PEM fuel cell system 50 comprises a PEM fuel cell 60. The PEM fuel cell 60 may comprise one, two, or more individual electrochemical cells, as described above. The PEM fuel cell 60 is in fluid communication with a fuel source vessel 52 through a fuel feed line 56. The PEM fuel cell 60 is also in fluid communication with an oxidant source vessel 54 through an oxidant feed line 58. The fuel feed line 56 provides hydrogen fuel to the anode side flow path(s) 62 in the PEM fuel cell 60, and the oxidant feed line 58 provides oxygen to the cathode flow path(s) 64 in the PEM fuel cell 60. A water storage vessel 66 is in fluid communication with a water outlet port 69 in the PEM fuel cell 60 through a product outlet line 68 comprising a product outlet valve 65. The PEM fuel cell system 50 further comprises a fuel recycle loop 72 and an oxidant recycle loop 74. The fuel recycle loop 72 is in fluid communication with a fuel outlet line 63 and the fuel feed line 56 and comprises a fuel recycle pump 71. The oxidant recycle loop 74 is in fluid communication with an oxidant outlet line 67 and the oxidant feed line 58 and comprises an oxidant recycle pump 73. The PEM fuel cell 60 is also in fluid communication with a fuel vent 86 through the fuel outlet line 63 and a fuel vent line 82 comprising a fuel vent valve 81. The PEM fuel cell 60 is also in fluid communication with an oxidant vent 88 through the oxidant outlet line 67 and an oxidant vent line 84 comprising an oxidant vent valve 83.

PEM fuel cells operate in a continuous mode. Still referring to FIG. 2, during operation, the fuel vent valve 81 is closed, the oxidant vent valve 83 is closed, the fuel recycle pump 71 is operational, the oxidant recycle pump 73 is operational, and the product outlet valve 65 is open. The hydrogen fuel flows from the fuel source vessel 52, through the fuel feed line 56, and into the anode side flow path(s) 62 in the PEM fuel cell 60. The oxygen flows from the oxidant source vessel 54, through the oxidant feed line 58, and into the cathode side flow path(s) 64 in the PEM fuel cell 60. The excess hydrogen fuel that is not oxidized in the PEM fuel cell 60 exits through the fuel outlet line 63 and recirculates through the fuel recycle loop 72 and the fuel feed line 56 back into the anode side flow path(s) 62 in the PEM fuel cell 60. The excess oxygen that is not reduced in the PEM fuel cell 60 exits through the oxidant outlet line 67 and recirculates through the oxidant recycle loop 74 and the oxidant feed line 58 back into the cathode side flow path(s) 64 in the PEM fuel cell 60.

As the closed-loop PEM fuel cell system 50 operates, the hydrogen fuel and the oxygen are continuously supplied from the respective source vessels 52 and 54 and unreacted hydrogen and oxygen continuously recirculate through the respective recycle loops 72 and 74. The construction of the PEM fuel cell 60 and the flowrate of the hydrogen fuel and the oxygen are configured to maintain the desired stoichiometry for the oxidation-reduction reactions that produce the electrons that are collected as the current that provides the electrical power produced by the PEM fuel cell 50. However, the hydrogen fuel and the oxygen supplied from the respective source vessels 52 and 54 often contain at least trace levels of inert gas impurities such as molecular nitrogen ($N_2$) and argon, for example. During operation, as fresh hydrogen fuel and oxygen are continuously supplied to the PEM fuel cell 60 from the respective source vessels 52 and 54, and react to produce water or are recirculated, additional inert gas impurities are also continuously introduced into and recirculate through the PEM fuel cell 60. Because the continuously added and recirculated impurities are chemically inert under the electrochemical conditions within the operating PEM fuel cell 60, the concentration of inert gas impurities within the PEM fuel cell 60 continuously increases during operation.

The continuous increase in the concentration of inert gas impurities within the PEM fuel cell 60 during operation is problematic because the impurities continuously decrease the partial pressure of the reactant gases ($H_2$ and $O_2$), effectively blocking the reactant gases from reaching the catalysts in the anode and cathode, which negatively affects the reaction efficiency and, in turn, the electrical power generation efficiency and overall performance of the PEM fuel cell 60. For example, PEM fuel cells are typically specified to provide electrical power within a defined voltage window. When inert gas build-up within the PEM fuel cell decreases reaction efficiency and electrical power generation efficiency, the generated current increases to meet the load on the PEM fuel cell and the overall fuel cell voltage drops out of specification resulting in overall performance loss. Additionally, some gas impurities can poison the catalyst, further reducing system performance.

To address these problems, the closed-loop PEM fuel cell 60 must be intermittently purged to remove the accumulated inert gas impurities from the PEM fuel cell 60 (including the anode side flow path(s) 62, the fuel recycle loop 72, the cathode side flow path(s) 64, and the oxidant recycle loop 74). Still referring to FIG. 2, the purging of the system comprises opening the fuel vent valve 81 and the oxidant vent valve 83 and allowing the gas present in the PEM fuel cell 60 to exit the closed-loop PEM fuel cell system 50 through the respective vents 86 and 88. However, purging the PEM fuel cell 60 and venting the purged gases external to the closed-loop PEM fuel cell system 50 is not feasible in many applications where the closed-loop condition of the PEM fuel cell system 50 cannot be interrupted. For example, it is not feasible to externally vent gases purged from closed-loop PEM fuel cells in underwater vehicles because of the resulting buoyancy changes. Moreover, the onboard storage of gases purged from fuel cells requires relatively large onboard storage vessels, which can disadvantageously increase the size and/or weight of vehicles comprising closed-loop PEM fuel cell systems. However, a closed-loop PEM fuel cell system without purging capability will lose performance during operation and eventually shut down if the operational period is sufficiently long such that the concentration of the continuously accumulating inert gas impurities increases to a level that renders the PEM fuel cell inoperable.

The present invention addresses this problem by providing a purge cell that receives the gases purged from a closed-loop PEM fuel cell and reacts the hydrogen and oxygen reactant gases to produce water, which is stored as a condensed liquid, thereby decreasing the volume of purged gases that must be stored during a mission or other closed-loop PEM fuel cell system operational period in which external venting is not feasible. The decrease in volume of purged gases that must be stored (essentially limited to the residual inert gas impurities) facilitates the use of smaller and lighter storage vessels, which decreases overall system size and weight.

Figure 3:
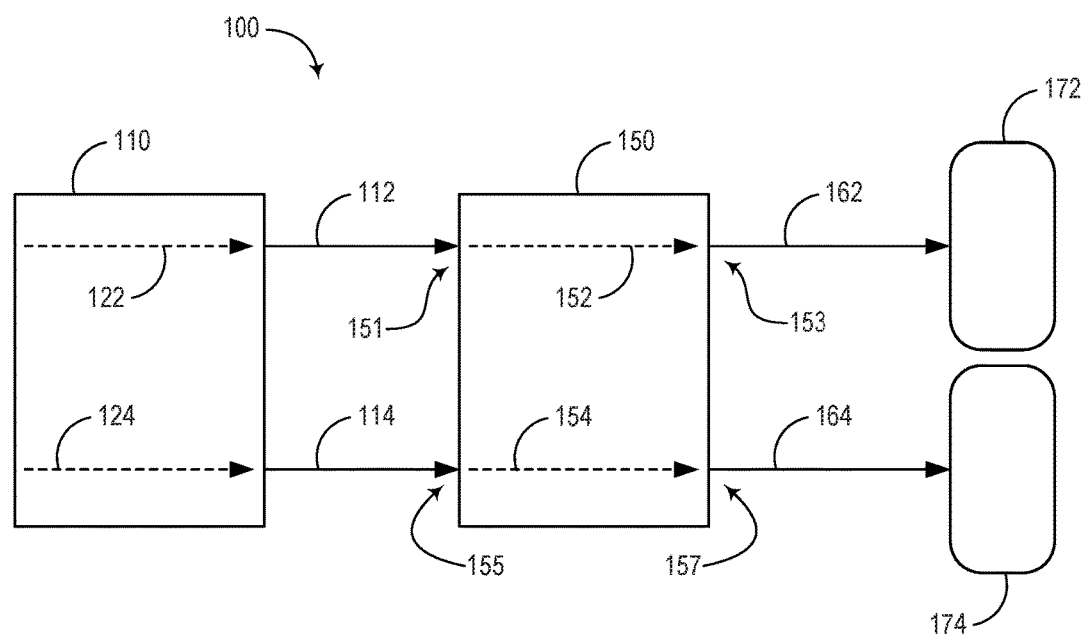
FIG. 3 is a schematic diagram of a fuel cell purge system comprising a primary fuel cell in fluid communication with a purge cell, wherein the purge cell is in fluid communication with an anode product storage vessel and a cathode product storage vessel.

Referring to FIG. 3, a fuel cell purge system 100 comprises a primary fuel cell 110 in fluid communication with a purge cell 150 through a fuel purge line 112 and an oxidant purge line 114. The purge cell 150 is in fluid communication with an anode product storage vessel 172 through an anode product line 162. The purge cell 150 is in fluid communication with a cathode product storage vessel 174 through a cathode product line 164. The primary fuel cell 110 can comprise a closed-loop PEM fuel cell, including fuel cell architectures comprising multiple-cell stacks, water-gas separation membranes, wicking structures, and/or reactant recirculation/recycle loops, as described above. In such implementations of the invention, the fuel purge line 112 comprises a hydrogen purge line and the oxidant purge line 114 comprises an oxygen purge line. The purge cell 150 can also comprise a PEM fuel cell; however, unlike a closed-loop PEM fuel cell that comprises recirculation/recycle loops and operates in a continuous mode, the purge cell 150 of this example is configured to operate in an intermittent batch mode, as described below. Additionally, while only one purge cell 150 is shown, it is understood that multiple purge cells can be used and, optionally, can operate out-of-phase to produce continuous useable power.

The primary fuel cell 110 comprises a primary fuel line 122 (e.g., a primary hydrogen line) and a primary oxidant line 124 (e.g., a primary oxygen line). As used in this specification, including the claims, the term "primary fuel line" includes the anode side flow path(s) located adjacent to the anode(s) within a fuel cell or fuel cell stack (e.g., in multiple-cell PEM fuel cells), and also any fluid conducting conduits or other volumes fluidly coupled (i.e., plumbed) to the anode side flow path(s). Likewise, as used in this specification, including the claims, the term "primary oxidant line" includes the cathode side flow path(s) located adjacent to the cathode(s) within a fuel cell or fuel cell stack (e.g., in multiple-cell PEM fuel cells), and also any fluid conducting conduits or other volumes fluidly coupled (i.e., plumbed) to the cathode side flow path(s). Accordingly, the primary fuel line of a fuel cell comprises the anode side flow path(s), the fuel outlet line(s), a fuel recycle loop (if present), and any related fluid coupling devices (e.g., a fluid collecting manifold that combines multiple anode side flow paths into a single fuel outlet line). Likewise, the primary oxidant line of a fuel cell comprises the cathode side flow path(s), the oxidant outlet line(s), an oxidant recycle loop (if present), and any related fluid coupling devices (e.g., a fluid collecting manifold that combines multiple cathode side flow paths into a single oxidant outlet line).

Still referring to FIG. 3, the primary fuel line 122 includes the anode side flow path(s) and the fuel outlet line(s) of the primary fuel cell 110. Likewise, the primary oxidant line 124 includes the cathode side flow path(s) and the oxidant outlet line(s) of the primary fuel cell 110. The primary fuel line 122 is fluidly coupled to the fuel purge line 112, and the primary oxidant line 124 is fluidly coupled to the oxidant purge line 114. The fuel purge line 112 can be plumbed to any component of the primary fuel line 122 (e.g., the fuel purge line 112 can be plumbed directly to the anode side flow path(s), a combined fuel outlet line, or a fuel recycle loop of the primary fuel cell 110). The oxidant purge line 114 can be plumbed to any component of the primary oxidant line 124 (e.g., the oxidant purge line 114 can be plumbed directly to the cathode side flow path(s), a combined fuel outlet line, or a fuel recycle loop of the primary fuel cell 110).

The purge cell 150 comprises an anode reaction chamber 152 (or multiple anode reaction volumes in multiple-cell configurations) that is fluidly coupled to a fuel inlet 151 and an anode product outlet 153, and thus, the anode product outlet 153 is in fluid communication with the fuel inlet 151 through the anode reaction chamber 152 (or multiple reaction volumes). The purge cell 150 also comprises a cathode reaction chamber 154 (or multiple cathode reaction volumes in multiple-cell configurations) that is fluidly coupled to an oxidant inlet 155 and a cathode product outlet 157, and thus the cathode product outlet 157 is in fluid communication with the oxidant inlet 155 through the cathode reaction chamber 154 (or multiple reaction volumes). The anode reaction chamber 152 (or multiple reaction volumes) and the cathode reaction chamber 154 (or multiple reaction volumes) are separated inside the purge cell by an electrolyte such as a non-electrically-conductive, proton-permeable, and gas-impermeable polymer-based membrane. The fuel inlet 151 of the purge cell 150 is in fluid communication with the primary fuel line 122 of the primary fuel cell 110 through the fuel purge line 112. The oxidant inlet 155 of the purge cell 150 is in fluid communication with the primary oxidant line 124 of the primary fuel cell 110 through the oxidant purge line 114. The anode product storage vessel 172 is in fluid communication with the anode product outlet 153 of the purge cell 150 through the anode product line 162.

The cathode product storage vessel 174 in fluid communication with the cathode product outlet 157 of the purge cell 150 through the cathode product line 164.

In operation, a purge cycle is initiated when the concentration of the continuously accumulating inert gas impurities in the primary fuel cell 110 increases to a level that causes the performance of the fuel cell 110 to decrease below a set point (e.g., the overall voltage across the primary fuel cell 110 decreases below specification). At that point, fluid control equipment will activate and fuel and inert gas from the primary fuel line 122 in the primary fuel cell 110 will transport through the fuel purge line 112 to the anode reaction chamber 152 in the purge cell 150, thereby removing fuel and at least a portion of the accumulated inert gas impurities from the primary fuel cell 110. Similarly, oxidant and inert gas from the primary oxidant line 124 in the primary fuel cell 110 will transport through the oxidant purge line 114 to the cathode reaction chamber 154 in the purge cell 150, thereby removing oxidant and at least another portion of the accumulated inert gas impurities from the primary fuel cell 110.

The transport of the fuel, oxidant, and inert gas from the primary fuel cell 110 to the purge cell 150 is driven by the pressurized fuel and oxidant feed lines that deliver the fuel and oxidant from the respective source vessels to the primary fuel cell (see FIG. 2, for example). When the anode reaction chamber 152 and the cathode reaction chamber 154 in the purge cell 150 are pressurized with the purged gases from the primary fuel cell (including, for example, hydrogen fuel, oxygen, and inert gases), the fluid control equipment will fluidly isolate the purge cell 150 and the fuel and the oxidant in the purge cell 150 will react to produce anode products and cathode products. The primary fuel cell 110 will also be fluidly isolated from the purge cell and continue operating in normal mode until the concentration of the continuously accumulating inert gas impurities in the primary fuel cell 110 increases to a level that causes the performance of the fuel cell 110 to decrease below the set point and another purge cycle is initiated.

The anode products are produced in the anode reaction chamber 152 and include concentrated inert gas impurities and trace levels of unreacted fuel (e.g., hydrogen gas). The cathode products are produced in the cathode reaction chamber 154 and include water, concentrated inert gas impurities, and trace levels of unreacted oxidant (e.g., oxygen gas). After a period of batch operation in which the fuel and the oxidant have substantially reacted to produce the anode and cathode products, the fluid control equipment will transport the anode products through the anode product line 162 to the anode product storage vessel 172, and transport the cathode products through the cathode product line 164 to the cathode product storage vessel 174.

Figure 4:
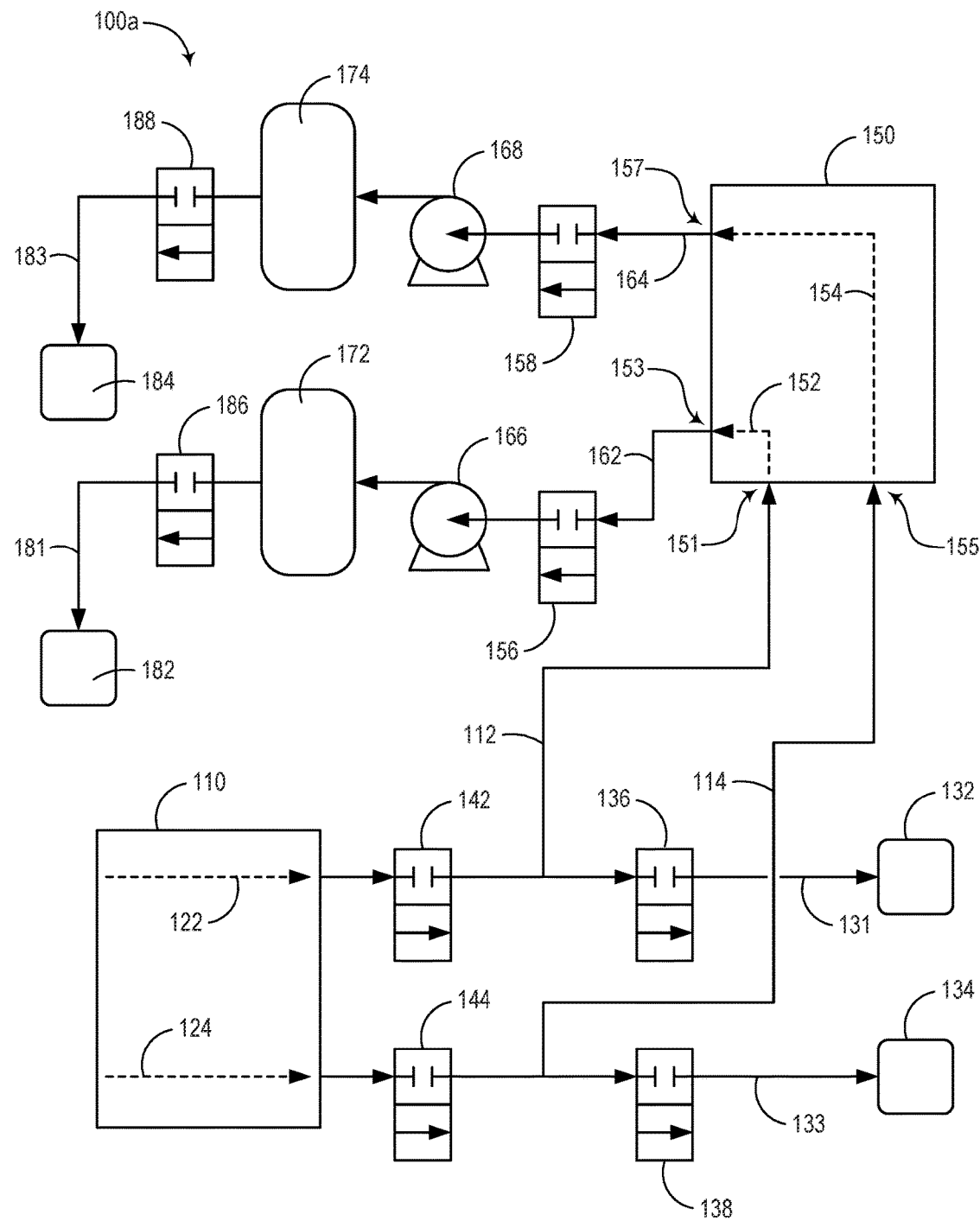
FIG. 4 is a schematic diagram of a fuel cell purge system comprising a primary fuel cell in fluid communication with a purge cell, wherein the primary fuel cell is also in fluid communication with primary vents, wherein the purge cell is in fluid communication with an anode product storage vessel and a cathode product storage vessel, and wherein the anode product storage vessel and the cathode product storage vessel are each in fluid communication with product drains.

FIG. 4 shows a more detailed example (100a) of the fuel cell purge system 100 shown in FIG. 3, including the fluid control equipment. The fuel cell purge system 100a comprises the primary fuel cell 110 in fluid communication with the purge cell 150 through the fuel purge line 112 and the oxidant purge line 114. A fuel purge valve 142 is located in the fuel purge line 112, and an oxidant purge valve 144 is located in the oxidant purge line 114. The fuel purge valve 142 is configured to control the transport of fuel fluid from the primary fuel cell 110 through the fuel purge line 112 to the purge cell 150, and the oxidant purge valve 144 is configured to control the transport of oxidant fluid from the primary fuel cell 110 through the oxidant purge line 114 to the purge cell 150.

The fuel cell purge system 100a further comprises a fuel vent 132 in fluid communication with the fuel purge line 112 through a fuel vent line 131. The fuel vent line 131 comprises a fuel vent valve 136 configured to control venting of fuel from the primary fuel cell 110 that bypasses the purge cell 150 in certain situations, described below. The fuel cell purge system 100a further comprises an oxidant vent 134 in fluid communication with the oxidant purge line 114 through an oxidant vent line 133. The oxidant vent line 133 comprises an oxidant vent valve 138 configured to control venting of oxidant from the primary fuel cell 110 that bypasses the purge cell 150 in certain situations, described below.

The purge cell 150 is in fluid communication with the anode product storage vessel 172 through the anode product line 162, and the purge cell 150 is in fluid communication with the cathode product storage vessel 174 through the cathode product line 164. The anode product line 162 comprises an anode product valve 156, and the cathode product line 164 comprises a cathode product valve 158. The anode product valve 156 is configured to control the transport of anode product fluid (concentrated inert gas impurities and trace amounts of fuel) from the purge cell 150 through the anode product line 162 to the anode product storage vessel 172. The cathode product valve 158 is configured to control the transport of cathode product fluid (water, concentrated inert gas impurities, and trace amounts of oxidant) from the purge cell 150 through the cathode product line 164 to the cathode product storage vessel 174. The anode product line 162 further comprises an anode product pump 166, and the cathode product line 164 comprises a cathode product pump 168. The anode and cathode product pumps 166, 168 drive the transport of the anode and cathode product fluids from the purge cell 150 through the anode and cathode product lines 162, 164 to the anode and cathode product storage vessels 172, 174. The anode and cathode product pumps 166, 168 also ensure that the anode and cathode reaction chambers 152 and 154 are evacuated and pumped down to a negative pressure after the reaction cycle in the purge cell 150 is complete.

The fuel cell purge system 100a further comprises an anode product drain 182 in fluid communication with the anode product storage vessel 172 through an anode product drain line 181, and a cathode product drain 184 in fluid communication with the cathode product storage vessel 174 through a cathode product drain line 183. The anode product drain line 181 comprises an anode product drain valve 186, and the cathode product drain line 183 comprises a cathode product drain valve 188. The anode and cathode product drain valves 186,188 are configured to drain the anode and cathode product storage vessels 172, 174 in certain situations, described below.

In normal operation of the primary fuel cell 110, the valves (142, 144, 136, 138, 156, 158, 186, and 188) comprising the fuel cell purge system 100a are in closed positions. As described above, a purge cycle is initiated when the concentration of the continuously accumulating inert gas impurities in the primary fuel cell 110 increases to a level that causes the performance of the fuel cell 110 to decrease below a set point (e.g., the overall voltage across the primary fuel cell 110 decreases below specification). At that point, the fuel purge valve 142 and the oxidant purge valve 144 are opened. For example, sensors measuring the voltage across the primary fuel cell 110 cell may indicate to a software-based control system that the primary fuel cell 110 is operating at a voltage below a defined set point, which can be different for different fuel cell equipment and/or applications. The software-based control system can then automatically open the fuel purge valve 142 and the oxidant purge valve 144 (e.g., the valves 142, 144, 136, 138, 156, 158, 186, and 188) can be implemented as solenoid valves that are opened and closed by the software-based control system).

When the fuel purge valve 142 and the oxidant purge valve 144 are opened, the fuel pressure (e.g., hydrogen gas pressure) and the oxidant pressure (e.g., oxygen gas pressure) in the primary fuel cell 110 will drive the transport of the fuel, oxidant, and inert gas from the primary fuel cell 110 through the fuel purge line 112 and the oxidant purge line 114 to the purge cell 150. That pressure is provided by the pressurized fuel and oxidant feed lines that deliver the fuel and oxidant from the respective source vessels to the primary fuel cell (see FIG. 2). When the fuel purge valve 142 and the oxidant purge valve 144 are opened, the primary fuel cell continues to operate normally because of the fresh fuel and oxidant that is continuously supplied from the respective source vessels.

The transport of the fuel, oxidant, and inert gas from the primary fuel cell 110 through the purge lines 112, 114 and open purge valves 142, 144 to the purge cell 150 removes fuel, oxidant, and at least a portion of the accumulated inert gas impurities from the primary fuel cell 110. The fuel and inert gas impurities purged from the primary fuel line 122 flow into and pressurize the anode reaction chamber 152 in the purge cell 150, and the oxidant and inert gas impurities purged from the primary oxidant line 124 flow into and pressurize the cathode reaction chamber 154 in the purge cell 150.

The anode reaction chamber 152 and the cathode reaction chamber 154 in the purge cell 150 can each comprise pressure sensors (located, for example, in the anode and cathode product lines 162, 164 downstream from the anode and cathode product outlets 153, 157. When the anode and cathode reaction chambers 152, 154 (or multiple reaction volumes in multiple-cell configurations) in the purge cell 150 are pressurized with the purged gases from the primary fuel cell, the pressure sensors can trigger the software-based control system to automatically close the fuel purge valve 142 and the oxidant purge valve 144, thereby again fluidly isolating the purge cell 150 from the primary fuel cell 110. The primary fuel cell 110 will continue operating in normal mode until the concentration of the continuously accumulating inert gas impurities in the primary fuel cell 110 again increases to a level that causes the performance of the fuel cell 110 to decrease below the set point and another purge cycle is initiated. It is understood that utilizing pressure sensors and transducers to control the operation of the purge cell 150 is only one non-exclusive example. An alternative example of controlling the operation of the purge cell 150 may comprise monitoring the purge cell voltage as an indication of the state of the purge cell 150. For instance, when the purge cell 150 reaches a voltage threshold, a software-based control system may automatically close the fuel purge valve 142 and the oxidant purge valve 144 to isolate the purge cell 150 and allow the fuel and oxidant reaction or proceed inside the purge cell 150.

The fuel and the oxidant in the purge cell 150 will react to produce anode products and cathode products. The electrical power generated in the purge cell 150 can be dissipated or used through an external load circuit (e.g., shunt resistor, heater, or other load). As the fuel (e.g., hydrogen gas) and oxidant (e.g., oxygen) are consumed in the purge cell 150, the gas pressure within the anode and cathode reaction chambers 152, 154 decreases and the pressures are constantly monitored by the respective pressure sensors. After substantially all of the fuel and oxidant are consumed in the purge cell 150 and the gas pressure within the anode and cathode reaction chambers 152, 154 decreases below a defined set point, the pressure sensors can trigger the software-based control system to automatically open the anode and cathode product valves 156, 158 and activate the anode and cathode product pumps 166, 168. Alternatively, after substantially all of the fuel and oxidant are consumed in the purge cell 150, the purge cell voltage will drop to zero, which can trigger the software-based control system to automatically open the anode and cathode product valves 156, 158 and activate the anode and cathode product pumps 166, 168.

The anode and cathode products produced in the anode and cathode reaction chambers 152, 154—including water, concentrated inert gas impurities and trace levels of unreacted fuel (e.g., hydrogen gas) and oxidant (e.g., oxygen gas)—are pumped out of the purge cell 150 through the anode and cathode product lines 162, 164 and transport into the anode and cathode storage vessels 172, 174. The pressure sensors can be used to determine when the purge cell has been evacuated, at which point the pressure sensors can trigger the software-based control system to automatically close the anode and cathode product valves 156, 158.

The anode and cathode product pumps 166, 168 facilitate the use of storage vessels such as, for example, pressurized tanks or other pressure vessels. The reaction of the hydrogen fuel and oxygen purged with the inert gas impurities from the primary fuel cell produces water which can be condensed or is otherwise storable in the liquid state, which substantially decreases the volume of gases that must be stored during a mission or other fuel cell system operational period in which external venting is not feasible. The decrease in volume of purged gases that must be stored (essentially limited to the residual inert gas impurities) facilitates the use of smaller and lighter storage vessels 172, 174, which decreases overall system size and weight.

Still referring to FIG. 4, the fuel and oxidant vent valves 136, 138 in the fuel and oxidant vent lines 131, 133 are normally kept closed during the operation of the primary fuel cell 110, including during normal operation and purge cycle operation. However, the fuel and oxidant vent valves 136, 138 can be used to purge and vent the primary fuel cell before and/or after a mission or other fuel cell system operational period when external venting is feasible. The anode and cathode product drain valves 186, 188 in the anode and cathode product drain lines 181, 183 are also normally kept closed during the operation of the primary fuel cell 110, including during normal operation and purge cycle operation. However, the anode and cathode product drain valves 186, 188 can be used to drain and/or vent the anode and cathode storage vessels 172, 174 after the completion of a mission or other fuel cell system operational period when external draining and/or venting is feasible.

Figure 5:
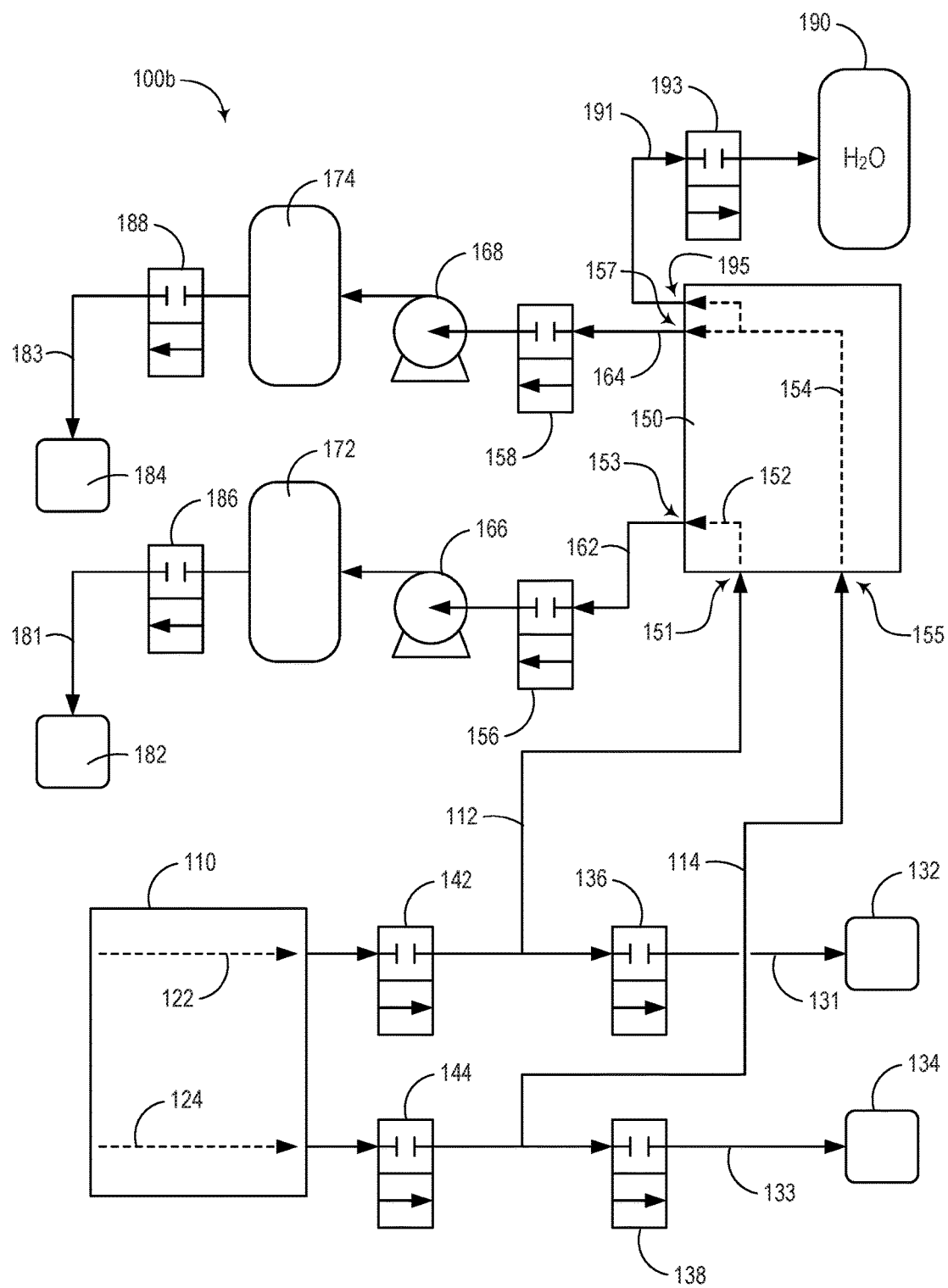
FIG. 5 is a schematic diagram of the fuel cell purge system shown in FIG. 4 and further comprising a water storage vessel in fluid communication with a water outlet port in the purge cell.

FIG. 5 shows an alternative example (100*b*) of the fuel cell purge system 100*a* shown in FIG. 4 including a separate water storage vessel 190. In the fuel cell purge system 100*a* shown in FIG. 4, the product water produced in the purge cell 150 is pumped out of the purge cell 150 and transports through the cathode product line 164 and is stored with the concentrated inert gases and trace oxidant in the cathode product storage vessel 174. In the fuel cell purge system 100*b* shown in FIG. 5, the product water produced in the purge cell 150 is separated from the concentrated inert gases and trace oxidant using, for example, a water-gas separation membrane. The separated water is transported out of the purge cell 150 through a water outlet port 195. The water outlet port 195 is in fluid communication with the water storage vessel 190 through a water transport line 191 comprising a water transport valve 193 (implemented, for example, using a solenoid valve). In operation, when the purge cell contains the pressured reactants (fuel and oxidant, e.g., hydrogen and oxygen) and inert gases purged from the primary fuel cell in the manner described above, the pressure sensors can trigger a software-based control system to open the water transport valve 193 and product water will separate from the gases in the purge cell 150 and transport through the water transport line 191 to the water storage vessel 190. After substantially all of the reactants are consumed in the purge cell 150 and the gas pressure within the anode and cathode reaction chambers 152, 154 decreases below a defined set point, the pressure sensors can trigger the software-based control system to automatically close the water transport valve 193 and open the anode and cathode product valves 156, 158 and activate the anode and cathode product pumps 166, 168 to transport the concentrated inert gases, trace reactants, and trace water to the storage vessels 172, 174.

Figure 6:
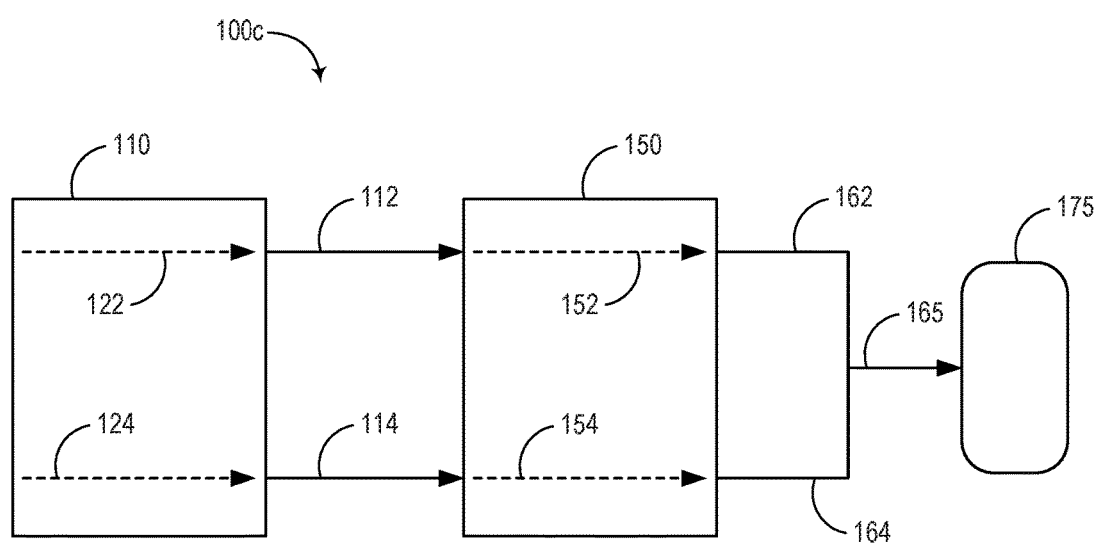
FIG. 6 is a schematic diagram of a fuel cell purge system comprising a primary fuel cell in fluid communication with a purge cell, wherein the purge cell is in fluid communication with a single product storage vessel.
Figure 7:
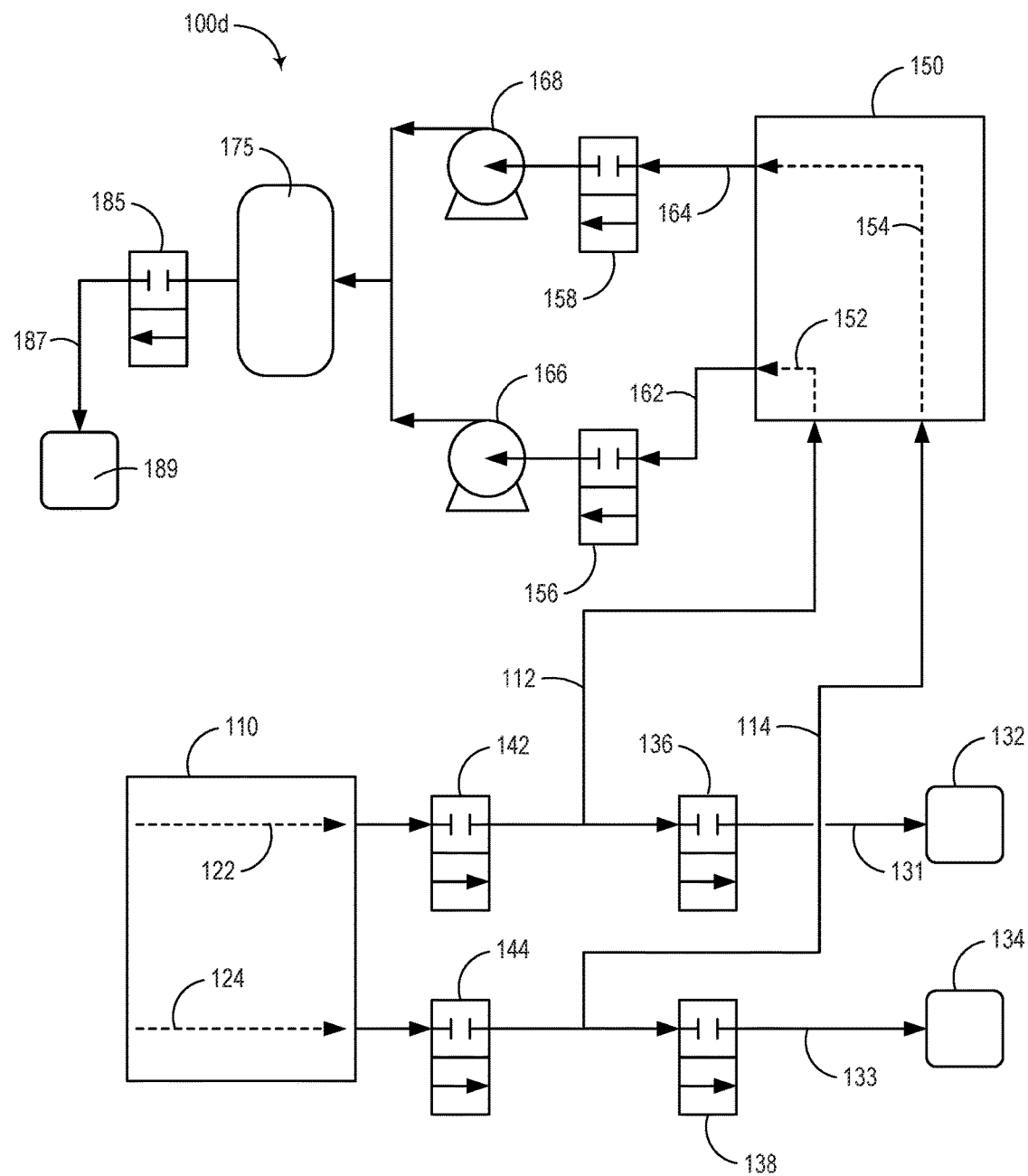
FIG. 7 is a schematic diagram of a fuel cell purge system comprising a primary fuel cell in fluid communication with a purge cell, wherein the primary fuel cell is also in fluid communication with primary vents, wherein the purge cell is in fluid communication with a single product storage vessel, and wherein the product storage vessel is in fluid communication with a product drain.
Figure 8:
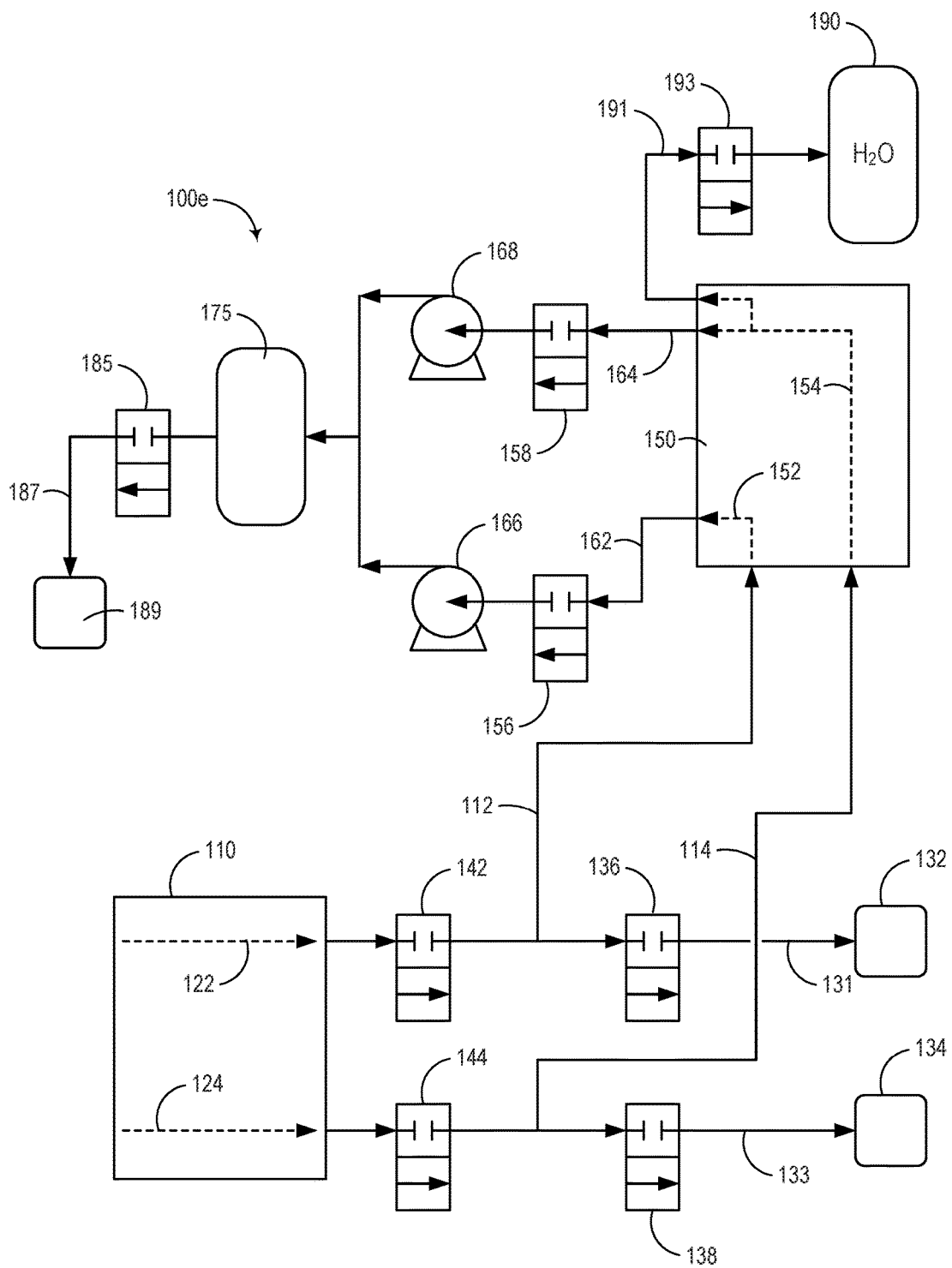
FIG. 8 is a schematic diagram of the fuel cell purge system shown in FIG. 7 and further comprising a water storage vessel in fluid communication with a water outlet port in the purge cell.

The fuel cell purge systems 100, 100*a*, and 100*b* shown in FIGS. 3, 4, and 5 comprise separate anode and cathode product storage vessels 172, 174. It is understood, however, that in some implementations, the anode product storage vessel and the cathode product storage vessel can comprise a single storage vessel in fluid communication with the purge cell. Referring to FIG. 6, a fuel cell purge system 100*c* comprises a primary fuel cell 110 in fluid communication with a purge cell 150 through a fuel purge line 112 and an oxidant purge line 114. The purge cell 150 is in fluid communication with a single product storage vessel 175 through anode and cathode product lines 162, 164 that combine into a single purge cell product line 165 that is fluidly coupled to the product storage vessel 175. The fuel cell purge system 100*c* operates in a manner analogous to the fuel cell purge system 100 described above in connection with FIG. 3. FIGS. 7 and 8 show more detailed examples (100*d*, 100*e*) of the fuel cell purge system 100*c* shown in FIG. 6. The fuel cell purge systems 100*d* and 100*e* operate in a manner analogous to the fuel cell purge systems 100*a* and 100*b* described above in connection with FIGS. 4 and 5, respectively. For example, the fuel cell purge systems 100*d* and 100*e* each comprise a product drain 189 in fluid communication with the product storage vessel 175 through a product drain line 187. The product drain line 187 comprises a product drain valve 185. The product drain 189, drain line 187, and drain valve 185 operate in a manner analogous to the anode and cathode product drains, drain lines, and drain valves described above.

In the examples shown in FIGS. 6, 7, and 8, the anode and cathode product lines 162 and 164 are combined before fluidly coupled to the product storage vessel 175. However, it is understood that in a fuel cell purge system comprising a single product storage vessel, the separate anode and cathode product lines exiting a purge cell do not need to be combined and may each fluidly couple separately to the single product storage vessel. Additionally, in a fuel cell purge system comprising a single product storage vessel, the system may also comprise a single product pump located in a combined purge cell product line downstream of a junction between separate anode and cathode product lines exiting a purge cell.

Figure 9A:
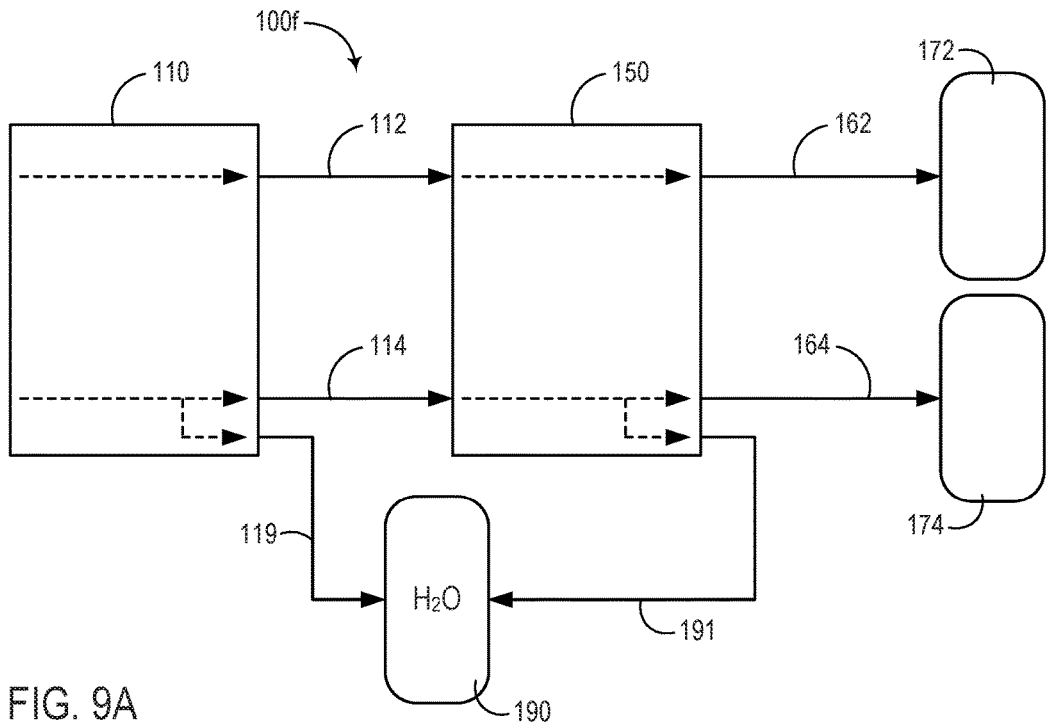
FIG. 9A is a schematic diagram of a fuel cell purge system comprising a primary fuel cell in fluid communication with a purge cell, wherein the purge cell is in fluid communication with an anode product storage vessel and a cathode product storage vessel, and wherein the primary fuel cell and the purge cell are both in fluid communication with a common water storage vessel.
Figure 9B:
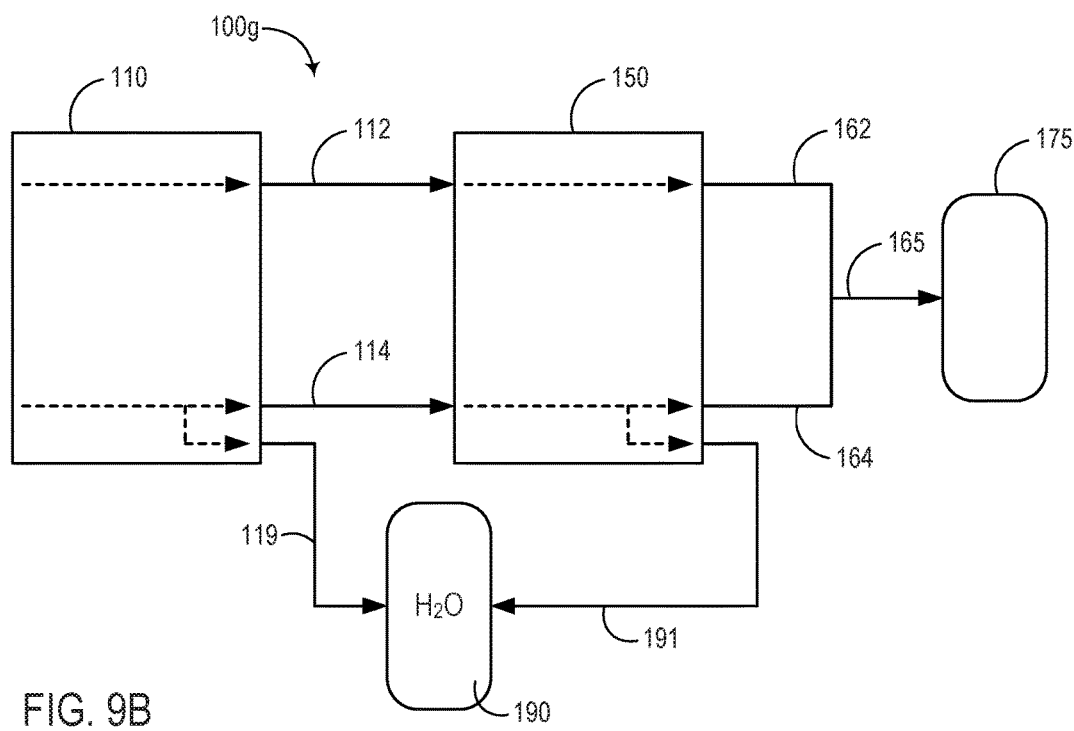
FIG. 9B is a schematic diagram of a fuel cell purge system comprising a primary fuel cell in fluid communication with a purge cell, wherein the purge cell is in fluid communication with a single product storage vessel, and wherein the primary fuel cell and the purge cell are both in fluid communication with a common water storage vessel.

In some implementations, a fuel cell purge system can comprise a common water storage vessel in fluid communication with both a primary fuel cell and a purge cell. Referring to FIGS. 9A and 9B, fuel cell purge systems 100*f* and 100g each comprise a primary fuel cell 110 in fluid communication with a purge cell 150 through a fuel purge line 112 and an oxidant purge line 114. The purge cell 150 is in fluid communication with either (1) anode and cathode product storage vessels 172, 174 (through separate anode and cathode product lines 162, 164) or (2) a single product storage vessel 175 (through anode and cathode product lines 162, 164 that combine into a common purge cell product line 165 that is fluidly coupled to the product storage vessel 175).

In the fuel cell purge systems 100f and 100g, the product water produced in the purge cell 150 is separated from the concentrated inert gases and trace oxidant using, for example, a water-gas separation membrane. The separated water is transported out of the purge cell 150 through a water outlet port in fluid communication with the water storage vessel 190 through the water transport line 191. Likewise, the product water produced in the primary fuel cell 110 is separated from the oxidant and inert gases using, for example, a water-gas separation membrane. The separated water is transported out of the primary fuel cell 110 through a water outlet port in fluid communication with the water storage vessel 190 through a water transport line 191. The fuel cell purge systems 100f and 100g operate in a manner analogous to the fuel cell purge systems 100-100e described above in connection with FIGS. 3-8.

The present invention also includes fuel cell purging processes performed using the fuel cell purge systems operating in the manner described in this specification. Additionally, the present invention also includes vehicles comprising the fuel cell purge systems described in this specification. Examples of such vehicles include, but are not limited to, submersibles and other underwater vehicles, including unmanned/autonomous underwater vehicles (UUVs/AUVs), aerospace launch vehicles, and automobiles.

The fuel cell purge systems described in this specification are particularly useful in UUV/AUV applications. UUVs/AUVs are typically powered by lithium-ion batteries; however, lithium-ion batteries possess insufficient specific energies to power UUVs/AUVs on relatively long-duration underwater deployments. Fuel cell systems, particularly PEM fuel cell systems, are a promising candidate power source for powering UUVs/AUVs on relatively long-duration missions. However, as described above, the continuous increase in the concentration of inert gas impurities within the PEM fuel cells during operation reduces system performance and will eventually render PEM fuel cells inoperable. External venting of the inert gas build-up during deployment is not feasible in UUV/AUV applications because of the resulting buoyancy changes, inability to overcome external atmospheric pressures at depth, or other application specific reasons. Additionally, onboard storage of purged inert gas build-up would require relatively large and heavy pressure vessels to accommodate both the inert gases and the reactant gases that are simultaneously purged with the inert gases from the fuel cells. The fuel cell purge systems described in this specification address these problems by facilitating the onboard storage of purged the inert gases in smaller and lighter storage vessels and without the need to simultaneously store the much larger volumes of purged reactant gases. Instead, the purged reactant gases are electrochemically converted to condensed water, which takes up much less volume and does not require pressure vessels for onboard storage.

The purge cycles can be performed using the described fuel cell purge systems periodically and/or as necessary to maintain the operational efficiency and performance of a primary fuel cell above defined set-points. Additionally, the described fuel cell purge systems can comprise one, two, or more additional fuel cells, each independently in fluid communication with a purge cell in the manner described above, to facilitate the long-term operation of the fuel cells without detrimental effects resulting from the build-up of inert gas impurities. Moreover, the electrical power generated by the purge cell can optionally be harnessed to do useful work. For example, the purge cell can be electrically coupled to a storage battery system to collect the electrical power generated during purge cycles. Alternatively, the purge cell can be electrically coupled to a shunt resistor.

As described above, the operation of the fuel cell purge system can be controlled using a software-based control system that interfaces with appropriate sensors and operates the fluid control devices (e.g., solenoid valves and pumps). The software-based control system can utilize control algorithms that effectively remove accumulated inert gas impurities while simultaneously minimizing the loss of fuel and oxidant reactants (e.g., hydrogen and oxygen).

The fuel cell purge system described in this specification also provides benefits during fuel cell start-up. When PEM fuel cell systems are shut-down, relatively large volumes of inert gas are often intentionally introduced into the fuel cell system to purge residual hydrogen and oxygen reactant gases and water from the system. However, on subsequent start-up, when hydrogen and oxygen reactant gases are reintroduced into the system, residual inert gas is often still present, and in closed-loop systems, it cannot be vented during or after start-up. The fuel cell purge system described in this specification allows any such residual inert gases to be purged efficiently before start-up by evacuating the entire system using the product pump(s) located downstream from the purge cell.

The rate at which the reaction cycle is conducted in the purge cell is dependent upon the anode and cathode active surface area in the purge cell, the diffusion path to the catalyst surfaces in the anode and cathode in the purge cell, and the electrical load on the purge cell. These parameters can be optimized for particular applications to minimize the volume of the anode and cathode reaction chambers and also to minimize the time required to complete the purge cycle. The use of a batch-operating purge cell facilitates nearly 100% conversion of the purged reactant gases to water, which minimizes storage volume of the inert gas impurities, which are concentrated in the gas phase in the purge cell during the reaction cycle. Additionally, the frequency of purge cycles can be optimized by balancing the effect of the inert gas build-up and the efficiency and performance loss of the fuel cell versus the loss of reactant gases that are simultaneously purged with the inert gas impurities.

The fuel cell purge system described in this specification can also be utilized to remove residual reactants from other locations of a closed loop fuel cell system to further minimize the total residual gas volume in the system. For example, the purge cell can be used to remove oxygen or hydrogen that is carried over in the product water to the water storage vessel. The purge cell can also be utilized to consume reactants during periods of system inactivity in closed loop systems that comprise reactant sources such as cryogenic storage sources that will pressurize the system over time. The purge cell can also be utilized to depressurize a primary fuel cell at a shutdown, where the purge cell will react the residual reactants contained in the primary fuel cell, creating the product water away from the primary fuel cell and ultimately pulling a vacuum on the primary fuel cell, thereby leaving the primary fuel cell in a state that is ready for a rapid startup.

ASPECTS OF THE INVENTION

Aspects of the invention include, but are not limited to, the following numbered clauses.

1. A fuel cell purge system comprising:
   a primary fuel cell comprising a primary fuel line and a primary oxidant line;
   a purge cell comprising a fuel inlet, an anode product outlet in fluid communication with the fuel inlet, an oxidant inlet, and a cathode product outlet in fluid communication with the oxidant inlet:
      wherein the fuel inlet of the purge cell is in fluid communication with the primary fuel line of the primary fuel cell through a fuel purge line; and
      wherein the oxidant inlet of the purge cell is in fluid communication with the primary oxidant line of the primary fuel cell through an oxidant purge line;
   an anode product storage vessel in fluid communication with the anode product outlet of the purge cell through an anode product line; and
   a cathode product storage vessel in fluid communication with the cathode product outlet of the purge cell through a cathode product line.

2. The fuel cell purge system of clause 1, further comprising a fuel purge valve located in the fuel purge line, and an oxidant purge valve located in the oxidant purge line, wherein the fuel purge valve is configured to control the transport of fuel fluid from the primary fuel cell through the fuel purge line to the purge cell, and wherein the oxidant purge valve is configured to control the transport of oxidant fluid from the primary fuel cell through the oxidant purge line to the purge cell.

3. The fuel cell purge system of clause 1 or clause 2, further comprising an anode product valve located in the anode product line, and a cathode product valve located in the cathode product line, wherein the anode product valve is configured to control the transport of anode product fluid from the purge cell through the anode product line to the anode product storage vessel, and wherein the cathode product valve is configured to control the transport of cathode product fluid from the purge cell through the cathode product line to the cathode product storage vessel.

4. The fuel cell purge system of any one of clauses 1-3, further comprising an anode product pump located in the anode product line, and a cathode product pump located in the cathode product line.

5. The fuel cell purge system of any one of clauses 1-4, further comprising an anode product drain in fluid communication with the anode product storage vessel through an anode product drain line, and a cathode product drain in fluid communication with the cathode product storage vessel through a cathode product drain line, wherein the anode product drain line comprises an anode product drain valve, and wherein the cathode product drain line comprises a cathode product drain valve.

6. The fuel cell purge system of any one of clauses 1-5, further comprising a fuel vent in fluid communication with the fuel purge line through a fuel vent line, and an oxidant vent in fluid communication with the oxidant purge line through an oxidant vent line, wherein the fuel vent line comprises a fuel vent valve, and wherein the oxidant vent line comprises an oxidant vent valve.

7. The fuel cell purge system of any one of clauses 1-6, wherein the anode product storage vessel and the cathode product storage vessel comprise a single storage vessel in fluid communication with the purge cell.

8. The fuel cell purge system of any one of clauses 1-7, further comprising a water storage vessel in fluid communication with a water outlet port in the purge cell.

9. The fuel cell purge system of clause 8, wherein the water storage vessel is also in fluid communication with a water outlet port in the primary fuel cell.

10. The fuel cell purge system of any one of clauses 1-9, wherein the primary fuel cell comprises a closed-loop proton exchange membrane fuel cell.

11. The fuel cell purge system of any one of clauses 1-10, wherein the purge cell comprises a batch-operated proton exchange membrane fuel cell comprising a single anode reaction chamber and a single cathode reaction chamber.

12. A vehicle comprising the fuel cell purge system of any one of clauses 1-11.

13. A fuel cell purge system comprising:
    a primary closed-loop proton exchange membrane fuel cell comprising a primary hydrogen line and a primary oxygen line;
    a secondary batch-operated proton exchange membrane fuel cell comprising a hydrogen inlet, an anode product outlet in fluid communication with the hydrogen inlet, an oxygen inlet, and a cathode product outlet in fluid communication with the oxygen inlet:
       wherein the hydrogen inlet of the secondary batch proton exchange membrane fuel cell is in fluid communication with the primary hydrogen line of the primary closed-loop proton exchange membrane fuel cell through a hydrogen purge line comprising a hydrogen purge valve; and
       wherein the oxygen inlet of the secondary batch proton exchange membrane fuel cell is in fluid communication with the primary oxygen line of the primary closed-loop proton exchange membrane fuel cell through an oxygen purge line comprising an oxygen purge valve;
    an anode product storage vessel in fluid communication with the anode product outlet of the secondary batch-operated proton exchange membrane fuel cell through an anode product line comprising an anode product valve and an anode product pump; and
    a cathode product storage vessel in fluid communication with the cathode product outlet of the secondary batch-operated proton exchange membrane fuel cell through a cathode product line comprising a cathode product valve and a cathode product pump.

14. The fuel cell purge system of clause 13, further comprising an anode product drain in fluid communication with the anode product storage vessel through an anode product drain line, and a cathode product drain in fluid communication with the cathode product storage vessel through a cathode product drain line, wherein the anode product drain line comprises an anode product drain valve, and wherein the cathode product drain line comprises a cathode product drain valve.

15. The fuel cell purge system of clause 13 or clause 14, further comprising a hydrogen vent in fluid communication with the hydrogen purge line through a hydrogen vent line, and an oxygen vent in fluid communication with the oxygen purge line through an oxygen vent line, wherein the hydrogen vent line comprises a hydrogen vent valve, and wherein the oxygen vent line comprises an oxygen vent valve.

16. The fuel cell purge system of any one of clauses 13-15, wherein the anode product storage vessel and the cathode product storage vessel comprise a single storage vessel in fluid communication with the secondary batch-operated proton exchange membrane fuel cell.

17. The fuel cell purge system of any one of clauses 13-16, further comprising a water storage vessel in fluid communication with a water outlet port in the secondary batch-operated proton exchange membrane fuel cell.

18. The fuel cell purge system of clause 17, wherein the water storage vessel is also in fluid communication with a water outlet port in the primary closed-loop proton exchange membrane fuel cell.

19. A vehicle comprising the fuel cell purge system of any one of clauses 13-18.

20. A fuel cell purging process comprising:
transporting fuel and inert gas from a primary fuel line in a primary fuel cell to an anode side in a purge cell;
transporting oxidant and inert gas from a primary oxidant line in a primary fuel cell to a cathode side in the purge cell;
reacting the fuel and the oxidant in the purge cell to produce anode products and cathode products; and
transporting the anode products, cathode products, and inert gas to at least one storage vessel.

21. The fuel cell purging process of clause 20, wherein the process is performed using the fuel cell purge system of any one of clauses 1-11 or clauses 13-18.

Various features and characteristics are described in this specification to provide an understanding of the structure, function, and operation of the invention, which includes the disclosed systems and processes. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a system that "comprises," "has," "includes," or "contains" one or more features and/or characteristics possesses those one or more features and/or characteristics, but is not limited to possessing only those one or more features and/or characteristics. Likewise, a component of a system that "comprises," "has," "includes," or "contains" one or more features and/or characteristics possesses those one or more features and/or characteristics, but is not limited to possessing only those one or more features and/or characteristics, and may possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. A fuel cell purge system comprising:
a primary fuel cell comprising a primary fuel line and a primary oxidant line;
a purge cell comprising a fuel inlet, an anode product outlet in fluid communication with the fuel inlet, an oxidant inlet, and a cathode product outlet in fluid communication with the oxidant inlet:
wherein the fuel inlet of the purge cell is in fluid communication with the primary fuel line of the primary fuel cell through a fuel purge line; and
wherein the oxidant inlet of the purge cell is in fluid communication with the primary oxidant line of the primary fuel cell through an oxidant purge line;
an anode product storage vessel in fluid communication with the anode product outlet of the purge cell through an anode product line; and
a cathode product storage vessel in fluid communication with the cathode product outlet of the purge cell through a cathode product line.

2. The fuel cell purge system of claim 1, further comprising a fuel purge valve located in the fuel purge line, and an oxidant purge valve located in the oxidant purge line, wherein the fuel purge valve is configured to control the transport of fuel fluid from the primary fuel cell through the fuel purge line to the purge cell, and wherein the oxidant purge valve is configured to control the transport of oxidant fluid from the primary fuel cell through the oxidant purge line to the purge cell.

3. The fuel cell purge system of claim 1, further comprising an anode product valve located in the anode product line, and a cathode product valve located in the cathode product line, wherein the anode product valve is configured to control the transport of anode product fluid from the purge cell through the anode product line to the anode product storage vessel, and wherein the cathode product valve is configured to control the transport of cathode product fluid from the purge cell through the cathode product line to the cathode product storage vessel.

4. The fuel cell purge system of claim 1, further comprising an anode product pump located in the anode product line, and a cathode product pump located in the cathode product line.

5. The fuel cell purge system of claim 1, further comprising an anode product drain in fluid communication with the anode product storage vessel through an anode product drain line, and a cathode product drain in fluid communication with the cathode product storage vessel through a cathode product drain line, wherein the anode product drain line comprises an anode product drain valve, and wherein the cathode product drain line comprises a cathode product drain valve.

6. The fuel cell purge system of claim 1, further comprising a fuel vent in fluid communication with the fuel purge line through a fuel vent line, and an oxidant vent in fluid communication with the oxidant purge line through an oxidant vent line, wherein the fuel vent line comprises a fuel vent valve, and wherein the oxidant vent line comprises an oxidant vent valve.

7. The fuel cell purge system of claim 1, wherein the anode product storage vessel and the cathode product storage vessel comprise a single storage vessel in fluid communication with the purge cell.

8. The fuel cell purge system of claim 1, further comprising a water storage vessel in fluid communication with a water outlet port in the purge cell.

9. The fuel cell purge system of claim 8, wherein the water storage vessel is also in fluid communication with a water outlet port in the primary fuel cell.

10. The fuel cell purge system of claim 1, wherein the primary fuel cell comprises a closed-loop proton exchange membrane fuel cell.

11. The fuel cell purge system of claim 1, wherein the purge cell comprises a batch-operated proton exchange membrane fuel cell comprising a single anode reaction chamber and a single cathode reaction chamber.

12. A vehicle comprising the fuel cell purge system of claim 1.

13. A fuel cell purge system comprising:
a primary closed-loop proton exchange membrane fuel cell comprising a primary hydrogen line and a primary oxygen line;
a secondary batch-operated proton exchange membrane fuel cell comprising a hydrogen inlet, an anode product outlet in fluid communication with the hydrogen inlet, an oxygen inlet, and a cathode product outlet in fluid communication with the oxygen inlet:
wherein the hydrogen inlet of the secondary batch-operated proton exchange membrane fuel cell is in fluid communication with the primary hydrogen line of the primary closed-loop proton exchange membrane fuel cell through a hydrogen purge line comprising a hydrogen purge valve; and
wherein the oxygen inlet of the secondary batch-operated proton exchange membrane fuel cell is in fluid communication with the primary oxygen line of the primary closed-loop proton exchange membrane fuel cell through an oxygen purge line comprising an oxygen purge valve;
an anode product storage vessel in fluid communication with the anode product outlet of the secondary batch-operated proton exchange membrane fuel cell through an anode product line comprising an anode product valve and an anode product pump; and
a cathode product storage vessel in fluid communication with the cathode product outlet of the secondary batch-operated proton exchange membrane fuel cell through a cathode product line comprising a cathode product valve and a cathode product pump.

14. The fuel cell purge system of claim 13, further comprising an anode product drain in fluid communication with the anode product storage vessel through an anode product drain line, and a cathode product drain in fluid communication with the cathode product storage vessel through a cathode product drain line, wherein the anode product drain line comprises an anode product drain valve, and wherein the cathode product drain line comprises a cathode product drain valve.

15. The fuel cell purge system of claim 13, further comprising a hydrogen vent in fluid communication with the hydrogen purge line through a hydrogen vent line, and an oxygen vent in fluid communication with the oxygen purge line through an oxygen vent line, wherein the hydrogen vent line comprises a hydrogen vent valve, and wherein the oxygen vent line comprises an oxygen vent valve.

16. The fuel cell purge system of claim 13, wherein the anode product storage vessel and the cathode product storage vessel comprise a single storage vessel in fluid communication with the secondary batch-operated proton exchange membrane fuel cell.

17. The fuel cell purge system of claim 13, further comprising a water storage vessel in fluid communication with a water outlet port in the secondary batch-operated proton exchange membrane fuel cell.

18. The fuel cell purge system of claim 17, wherein the water storage vessel is also in fluid communication with a water outlet port in the primary closed-loop proton exchange membrane fuel cell.

19. A vehicle comprising the fuel cell purge system of claim 1.

* * * * *